United States Patent [19]

Renard et al.

[11] Patent Number: 4,985,209
[45] Date of Patent: Jan. 15, 1991

[54] APPARATUS FOR INJECTING A HYDROCARBON CHARGE INTO A REACTOR

[75] Inventors: Pierre Renard, Saint Nom la Breteche; Jean-Claude Simandoux, Sainte Foy les Lyon; Jean-Pierre Burzynski, Lyon, all of France

[73] Assignee: Institut Francais du Petrole, Rueil-Malmaison, France

[21] Appl. No.: 277,594

[22] Filed: Nov. 29, 1988

[30] Foreign Application Priority Data

Nov. 30, 1987 [FR]  France ................................. 87 16692
Jun. 23, 1988 [FR]  France ................................. 88 08576

[51] Int. Cl.⁵ .................................................. B01J 8/18
[52] U.S. Cl. ..................................... 422/140; 422/143; 422/147; 422/220
[58] Field of Search .............. 422/140, 141, 142, 143, 422/147, 207, 220; 34/57 C, 57 A; 122/4 D; 110/245; 431/7

[56] References Cited

U.S. PATENT DOCUMENTS

| | | | |
|---|---|---|---|
| 3,818,606 | 6/1974 | Marcellini | 34/57 A |
| 4,135,889 | 1/1979 | Mori | 34/57 A |
| 4,392,943 | 7/1983 | Euzen et al. | 422/143 |
| 4,478,707 | 10/1984 | Bischoff et al. | 422/140 |
| 4,571,326 | 2/1986 | Bischoff et al. | 422/207 |
| 4,628,831 | 12/1986 | Delessard et al. | 34/57 A |
| 4,639,354 | 1/1987 | Bischoff et al. | 422/140 |
| 4,674,564 | 6/1987 | Chrysostome et al. | 34/57 A |
| 4,707,340 | 11/1987 | Milligan | 422/140 |
| 4,764,347 | 8/1988 | Milligan | 422/140 |

Primary Examiner—Robert J. Warden
Assistant Examiner—Amalia L. Santiago
Attorney, Agent, or Firm—Millen, White & Zelano

[57] ABSTRACT

The invention concerns an apparatus comprising (FIG. 3):

a substantially vertical reactor (1), means (2) for introducing solid particles into the upper part of the reactor, means (4) for withdrawing solid particles from the lower part of the reactor, at least one funnel defining a flared zone (25), whose apex is turned downwardly, and means (7 and 8) for introducing a fluid charge, formed of a liquid and a gas, into the lower part of the reactor under the funnel (25).

The apparatus is characterized by the presence of a charge injection device, comprising:

at least one substantially vertical leg or pipe (24) passing through the funnel, and a cap (26) covering the upper end of pipe (24), the lower part (or fringe) of the cap comprising several indentations or a series of indentations arranged over the major part of its perimeter.

10 Claims, 7 Drawing Sheets

APPARATUS FOR INJECTING A HYDROCARBON CHARGE INTO A REACTOR

The present invention concerns an apparatus for the catalytic treatment (or hydrotreatment) of a fluid charge, more particularly for hydrocarbon demetallization, desulfurization, hydrotreatment and conversion or hydroconversion, in a fixed or moving bed, as explained hereinafter.

The invention is particularly applicable to the catalytic treatment of liquid charges such as, for example, distillates originating from heavy crude oils, hydrocarbon straight-run and vacuum residues, these treatments being generally conducted in the presence of hydrogen and/or gas mixtures of high hydrogen content, over a bed of solid catalyst, the catalyst being used as particles (extrudates, balls or particles of various other shapes, etc.).

During these catalytic treatments, the catalyst is often quickly deactivated by the presence of catalyst poisons, by coke formation, by deposition of certain metals, etc.

This deactivation requires the frequent replacement of at least a part of the catalyst bed.

In the apparatus of the invention, the catalyst is progressively withdrawn from the reactor. The term "progressively" means that the catalyst may be withdrawn: either periodically, for example, at intervals from 1/10 to 10 days or more, by withdrawing at each time a fraction of, for example, 0.5 to 15% of the total catalyst amount. However, if necessary, a larger catalyst amount, for example, as high as 100% of the catalyst amount, i.e., the total catalyst amount, may be withdrawn.

The catalyst withdrawing frequency may be much higher (intervals of about one minute or one second, for example), the withdrawn amount being correspondingly reduced.

or continuously.

The fresh catalyst is introduced at the upper part of the reactor. The system for introducing together the charge and hydrogen as a mixed fluid flowing upwardly through the reactor is an object of the present invention.

The devices according to the invention are thus convenient for introducing a charge which has to be contacted with catalyst particles into reactors used for operations of cracking, hydrocracking, hydroreforming, manufacture of aromatic hydrocarbons, isomerization of paraffinic, naphthenic or aromatic hydrocarbons, various reactions of hydrogenation, hydrotreatment, dehydrogenation, alkylation, transalkylation, hydrodecyclization, hydrodealkylation, hydrovisbreaking treatments, etc., The charge and/or gases introduced into these reactors flow upwardly.

The fluid charge, generally a liquid and gas mixture, is introduced into the reactor or enclosure containing catalyst particles through distribution means located at the lower part of the reactor or enclosure and flows upwardly (up-flow) in countercurrent direction with respect to the catalyst flow, before being discharged, after treatment, at the lower part of the reactor (or of the enclosure arbitrarily called "reactor" hereinafter). The catalyst flow, by gravity, provides for an even lowering of the catalyst bed, whereas the upward flow or the fluid charge makes it easy, in particular, to adjust the residence time and provides for a controlled unpacking of the bed.

On the other hand, the countercurrent flow of the charge and the catalyst provides for a high catalytic conversion since the fresh catalyst, introduced at the top of the reactor, treats an almost converted charge (i.e., a charge essentially containing difficultly convertible compounds), whereas, at the reactor bottom, the used catalyst treats a fresh charge (containing a high proportion of easily convertible compounds), thus performing efficiently the first conversion steps. This results in a more efficient use of the catalyst in the reactor and a more even thermal profile of the catalyst bed than with a co-current flow, with the advantage, in particular, of a more moderate temperature at the reactor bottom, reducing the catalyst coking liability.

BACKGROUND OF THE INVENTION

U.S. Pat. No. 3,826,737 discloses a conversion process using a moving bed catalyst, more particularly adapted to a co-current flow of the catalyst and the liquid charge, the latter being discharged at the reactor bottom through a cylindrical grid located at the bottom of a catalyst discharge cone supporting the catalyst bed.

Such a process has the disadvantage of a possible clogging of the grid by the catalyst particles pushed against said grid by the liquid charge discharged from the reactor bottom. This may then result in an irregular distribution of the fluids within the catalyst, flow difficulties for the catalyst bed with eventual blocking of certain zones thereof, together with an increase in catalyst attrition caused by friction between blocked particles and free particles of the catalyst bed and between free catalyst particles and the liquid charge discharge grid.

In order to avoid said disadvantages, U.S. Pat. No. 4,571,326 discloses two devices, illustrated in FIGS. 1 and 2 of the accompanying drawings, which do not conform with the invention. The disclosed technique involved injecting the liquid and the gases below the wall supporting the catalyst bed, while using a suitable device for the gas-liquid distribution.

More particularly, this result was obtained by a process (with progressive withdrawal of the powdery solid particles from a generally confined space) for introducing into said space a fluid charge formed of a liquid and a gas (generally hydrogen), said generally confined space having substantially the shape of an elongate and substantially vertical volume of revolution, the solid particles being introduced at the upper part and progressively withdrawn from the lower part of the enclosure after downward passage therethrough, whereas the fluid charge is introduced at least partly and generally continuously at the lower part of the enclosure and is withdrawn from the upper part thereof after upward passage through said enclosure. The solid particles are progressively withdrawn from the lower end of at least one flared zone, the shape of which depends on the reactor geometry and is generally that of an overturned cone or pyramid, i.e., a cone or pyramid whose apex is turned downwardly, said apex being pierced with a hole of suitable size for discharging the solid particles, the wall of said flared zone being substantially and regularly discontinuous, i.e., provided with at least several regularly spaced openings, each of sufficiently small size to avoid the passage of solid particles through said wall but sufficiently large to give passage to an upward flow of the fluid charge. The process is characterized by the introduction of the fluid charge at the lower part of said enclosure through at least one distribution zone of particular shape located below said wall.

BRIEF DESCRIPTION OF THE DRAWINGS

The invention and the closest prior art are illustrated by the accompanying drawings wherein.

Figure 1:
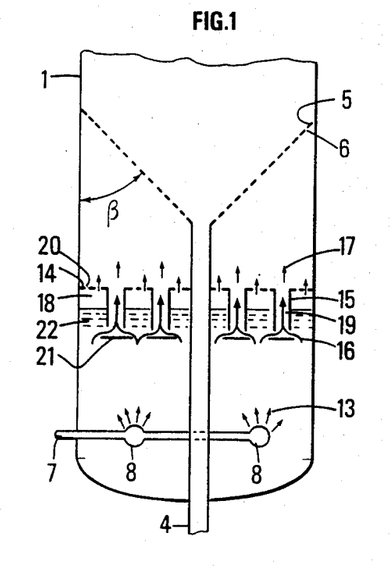
FIGS. 1 and 2 illustrate devices of the prior art.
Figure 2:
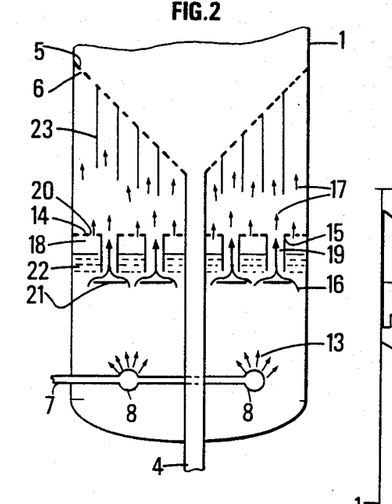

According to the technique of the first device shown in FIG. 1 (the reference numerals in FIGS. 1 and 2, which do not conform with the invention, being, for sake of better understanding, the same as in FIGS. 6 and 7 of U.S. Pat. No. 4,571,326), the reactor (1) contains, between grid (5) supporting the catalyst, catalyst withdrawal through line 4 and the spray tubes such as (7) of the charge distribution zones, diagrammatically shown as discs (8), an additional grid (14) whose perforations (20) are sufficiently small to prevent passage therethrough of the major part of the fluid liquid phase (introduced through distribution zones 8), giving only passage to the major part of the fluid gaseous phase. Substantially vertical solid (i.e., not perforated) walls, for example, funnels, are arranged, generally at regular intervals, below said grid (14) which supports them, and extend downwardly to a sufficiently low level of the reactor (generally a level above that of the distribution zones 8), thus defining a compartment (18) and funnels (19): the fluid gaseous fraction in major part reaches (arrows 17) the grid (5) through compartment (18) and orifices (20), after passage through zones (22) where a liquid phase and a gas phase are accumulated and separated. Plates or baffles (21) are placed below the lower ends of funnels (19) (and above the level of the distribution zones) so that the mixed fluid injected through the distribution zones (8) and flowing as shown by arrows (13), accumulates into compartment (18), thus generating liquid and gas accumulation zones (22), the major part of the liquid rushing through funnels (19) (along the path shown by arrows 16). The above-described device thus has both the effects of mixing and dispersing the fluid charge.

The devices shown in FIG. 1 were still improved in U.S. Pat. No. 4,571,326. As a matter of fact, the gases, flowing in the direction of arrows (17), tend to accumulate in the B angles defined by the walls of grid (5) of one or more flared funnels and the wall of reactor (1). In order to avoid a gas migration below the upper flared part of the funnel, so as to improve the gas and liquid distribution over the whole bed section, the gas phase (originating from the orifices 20 of grid 14) evolves through a plurality of non-communicating elongate parallel zones, substantially vertical or oblique or partly vertical and partly oblique, compelling the gas particles to follow a controlled path below one or more flared funnels. FIG. 2 illustrates this improvement: it shows the same fittings as in FIG. 1 with, in addition, a plurality of vertical elongate zones, separated by vertical walls (23). On the right-hand side of FIG. 1, all the lower ends of said walls are at the same level and on the left-hand side they are shown at different levels. The length and the level of said walls essentially depend on the geometry of the distribution zones.

SUMMARY OF THE INVENTION

An object of the invention is to further improve the fluid dispersion within the catalyst bed and to always obtain an even dispersion therein in a wide range of flow rates, by means of a new device for introducing together the charge and the gas (hydrogen), which opens into the catalyst bed itself and not below the grid which supports the catalyst. As a first consequence of the use of said device, it is possible to replace the grid supporting the catalyst (which may be frequently clogged) by a wall of substantially continuous surface, i.e., without openings such as slots or perforations of sufficiently small size to prevent passage of the catalyst particles, but sufficiently large to give passage to a liquid charge or to gases. The only openings of said walls are those arranged (in addition to the catalyst discharge duct) for giving passage to the legs or pipes of the device for injecting or distributing the charge and the gases.

According to the present invention (see FIG. 3), the reactor (1) comprises at its upper part means for progressively introducing fresh (new or regenerated) catalyst, shown as duct (2) supplying catalyst particles for feeding a fixed or moving catalyst bed (3).

Figure 3:
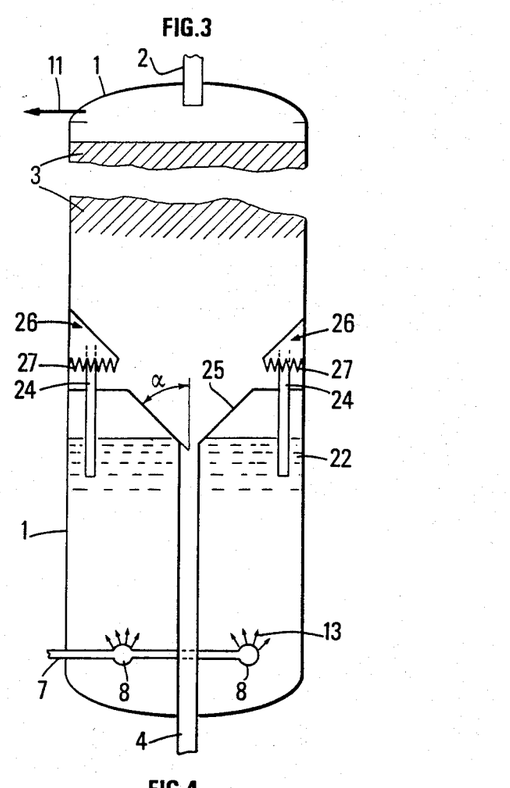
FIG. 3 illustrates a first embodiment of the device according to the invention, comprising a cap covering the upper ends of injection pipes.

The catalyst flows by gravity into the reactor and is progressively discharged through duct (4) at the lower part thereof, after intermediary passage through at least one withdrawing funnel (25). This or these funnel(s), defining a flared zone, are shaped as an overturned cone or cone frustum or as an overturned pyramid or pyramid frustum. As indicated above, the wall or walls of said funnel(s) are substantially continuous and, in addition to duct (4) for the catalyst withdrawal, have no openings except for the passage of legs or pipes (24) for injecting the charge, as hereinafter defined.

The angle α formed between the cone axis (or the pyramid axis when the funnel has this shape) and a generatrix of the cone (or one of the pyramid edges) generally ranges from 10° to 80°, preferably from 20° to 50° or from 30° to 40°.

The fluid charge is thus introduced at the lower part of reactor (1) through at least one distribution zone comprising, for example, a distribution spray tube (7) (horizontal, oblique or vertical, for example, vertical in certain industrial reacttors, provided with at least one end part (8) of convenient shape, for example, star-shaped, shaped as an anti-splash nozzle, etc., so as to disperse the fluid in multiple directions (indicated by arrows 13).

The fluid charge or mixed fluid (formed of liquid and gas phases) flows upwardly through the reactor, in counter current flow with respect to the catalyst, before being discharged at the upper part of the reactor through collecting and discharge means diagrammatically shown as line (11), for example, shaped as a rake formed of collector tubes connected to a discharge duct.

Figure 7:
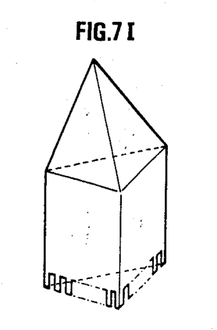
FIGS. 7A to 7J illustrate various types of caps.
Figure 7A:
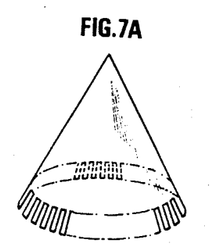
Figure 7B:
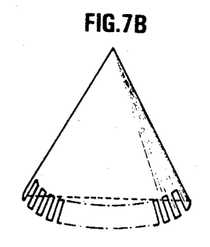
Figure 7C:
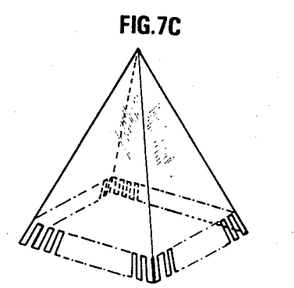
Figure 7D:
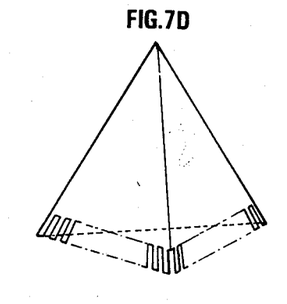
Figure 7E:
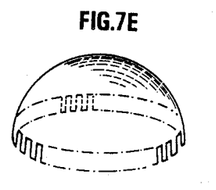
Figure 7F:
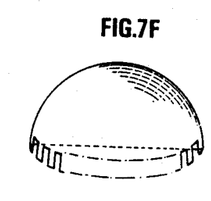
Figure 7G:
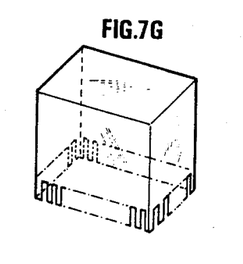

The mixed fluid injected through the distribution zone (7) flows towards the one or more funnel(s) supporting the catalyst bed and forms, before reaching said funnel(s), a liquid-gas accumulation zone of mixed fluid. In contrast with the prior art disclosed in U.S. Pat. No. 4,571,326, a liquid-gas separation is unnecessary at this level. Legs (24) dip into the upper part of zone (22). In the operating conditions prevailing in the reactor and as an effect of the mixed fluid feeding conditions at the reactor bottom, said mixed fluid rushes upwardly through the tubular legs (24) and enters the space provided for the catalyst bed above the one or more funnels of flared shape supporting said catalyst bed. A cap (26) placed above each leg acts as an anti-splash member for the injected fluid, whereby the latter is propelled in several directions within the catalyst mass. This cap to protect, in addition, protects and isolates the upper end part of each leg by preventing any direct contact thereof with the catalyst particles. The cap may have any shape adapted to conveniently cover, as an umbrella, the upper end of each leg (24) and at least a part of the upper portion thereof. The cap may be shaped, for example, as a semi-sphere (FIG. 7E), a cone frustum (FIG. 7A), a pyramid frustum (FIG. 7C), a prism (FIG. 7H), or a parallelipiped (FIG. 7G).

Figure 4:
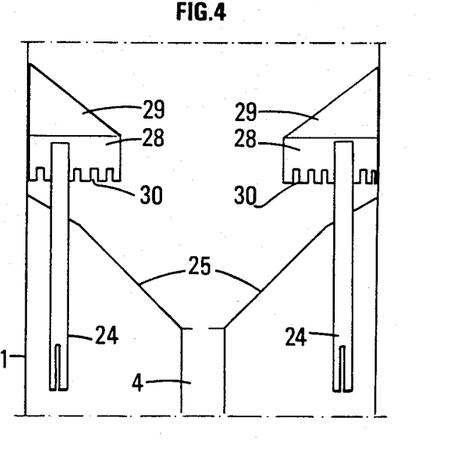
FIG. 4 is an enlarged view of the upper part of the reactor of FIG. 3, with a different type of cap.
Figure 5:
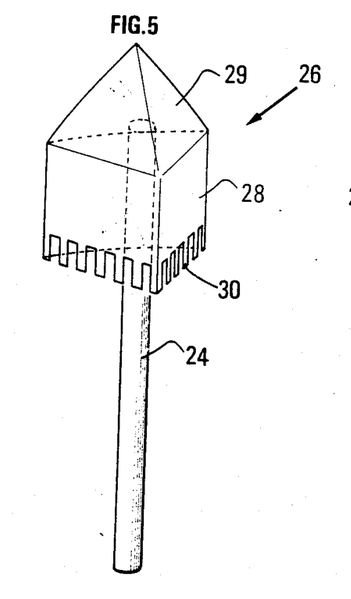
FIG. 5 is a view of a particular type of cap with the associated injection pipe.
Figure 7H:
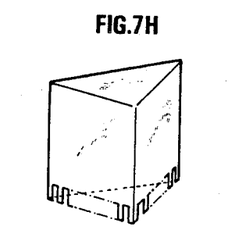

A particular position of the cap is the position wherein one of its walls substantially joins the internal wall of the reactor, as in FIG. 3 for cap (26). The cap wall joining the reactor internal wall is either substantially plane or curved, so as to conveniently fit to the reactor internal wall. For sake of simplicity of the description, it will be considered, in the present invention, that such a wall of the cap joining (tangent to) the reactor internal wall is substantially planar. This assumption is not far from the mark, in view of the relatively large diameter of the reactor as compared with the size of each cap. Examples of caps having a wall joining substantially the reactor internal wall are those shaped as a quarter sphere (FIG. 7F), a semi-cone frustum (FIG. 7B), a semi-pyramid frustum (FIG. 7D), and a prism (FIG. 7H). A particular type of appropriate arrangement is illustrated in each of FIGS. 4 and 5. The cap (26) is formed by association of a prism (28) and a semi-pyramid frustum (29), bearing on the reactor internal wall. As mentioned above, depending on the capacity of the manufacturers to produce these types of apparatus, the walls of said prism and of said pyramid semi-frustum bearing on the reactor wall may be planar, or curvilinear to better fit to the reactor wall.

Figure 7J:
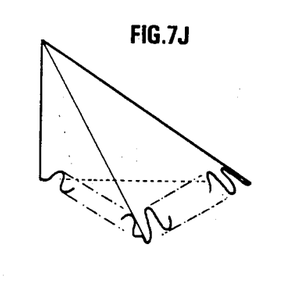

Furthermore, for a good dispersion of the mixed fluid through the catalyst mass, after its impact against the upper face of the cap, it is necessary that the bottom part of said cap, i.e., the fringe, be not smooth but indented to a major extent over its whole perimeter. This fringe may have various outlines, shaped for example as saw-teeth (27) (FIGS. 3 and 7A to 7I) or with loopholes (30) (FIGS. 4 and 5), in zigzag or notched, or sinusoid-shaped as shown in FIG. 7J. The height of each indentation of the fringe (for example, the height of each tooth, of each loop-hole or of each notch) is from 0.1 to 30%, preferably 2-25%, more particularly 5-15% of the total height of the cap).

Figure 6:
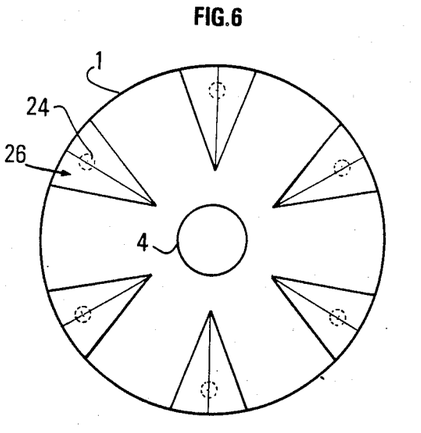
FIG. 6 is a cross-sectional view of the reactor of FIG. 3, equipped with several caps concentrically arranabout the catalyst withdrawing pipe.

An arrangement according to the invention, particularly suitable for small reactors, consists of positioning caps all along the reactor internal periphery. Depending on the cap size, a series of 6 to 15, more preferably 6-12, tangent caps, joined together or not, might be used. FIG. 6 shows a cut of reactor (1) associated with a leg (24), wherein said caps are concentrically distributed about the catalyst withdrawing pipe (4). For large reactors, associations of different types of the abovedescribed caps distributed within the reactor can be used.

For example, a large reactor equipped with several funnels (joined) may be provided with 2 to 800 caps and legs, distributed at the periphery of said cones (1 to 100 withdrawing cones).

Accordingly, the apparatus according to the invention (see FIG. 3) comprises:

a substantially vertical reactor (1) of a substantially elongate and cylindrical shape, means (2) for introducing solid particles at the upper part of the reactor, means for withdrawing solid particles from the lower part of the reactor, essentially consisting of at least one substantially vertical pipe (4), at least one funnel or flared zone (25), whose apex is turned downwardly and supports said solid particles, placed in the lower part of the reactor and perforated so as to give passage to pipe (4) and to at least two other pipes (24) forming part of at least one fluid injection device, said device being defined hereinafter, means (7 and 8) for introducing said fluid charge, formed of a liquid and a gas, into the lower end of the reactor, below said funnel (25), means (11) for withdrawing the reaction effluents from the upper part of reactor (1), said apparatus being characterized by the presence of at least two injection devices for a charge, each device comprising:

a substantially vertical leg or pipe (24) passing through said funnel, i.e., having a lower end below the wall or walls of said funnel (and above the means 7 and 8 for introducing said charge), and whose upper end is located above said funnel and relatively close thereto, a cap (26) covering the upper end of pipe (24), the lower part (or fringe) of said cap comprising several indentations or series of indentations arranged on the major part of its perimeter.

Preferably, for a reactor with a single cone, the legs (24) are placed in the vicinity of the funnel periphery, close to the reactor internal wall.

A particular arrangement concerns more particularly the large reactors where it is possible to use in association the different types of caps described hereinafter (shaped as spheres, cones, pyramids, parallelipipeds, or of any other shape) distributed within the reactor. Thus, a large reactor will be provided with several funnels, optionally joined, and with 7 to 700 caps (each associated with a leg or pipe) distributed at the periphery of said cones (3 to 100 withdrawing funnels) (see, for example, FIGS. 10 and 11).

Figure 8:
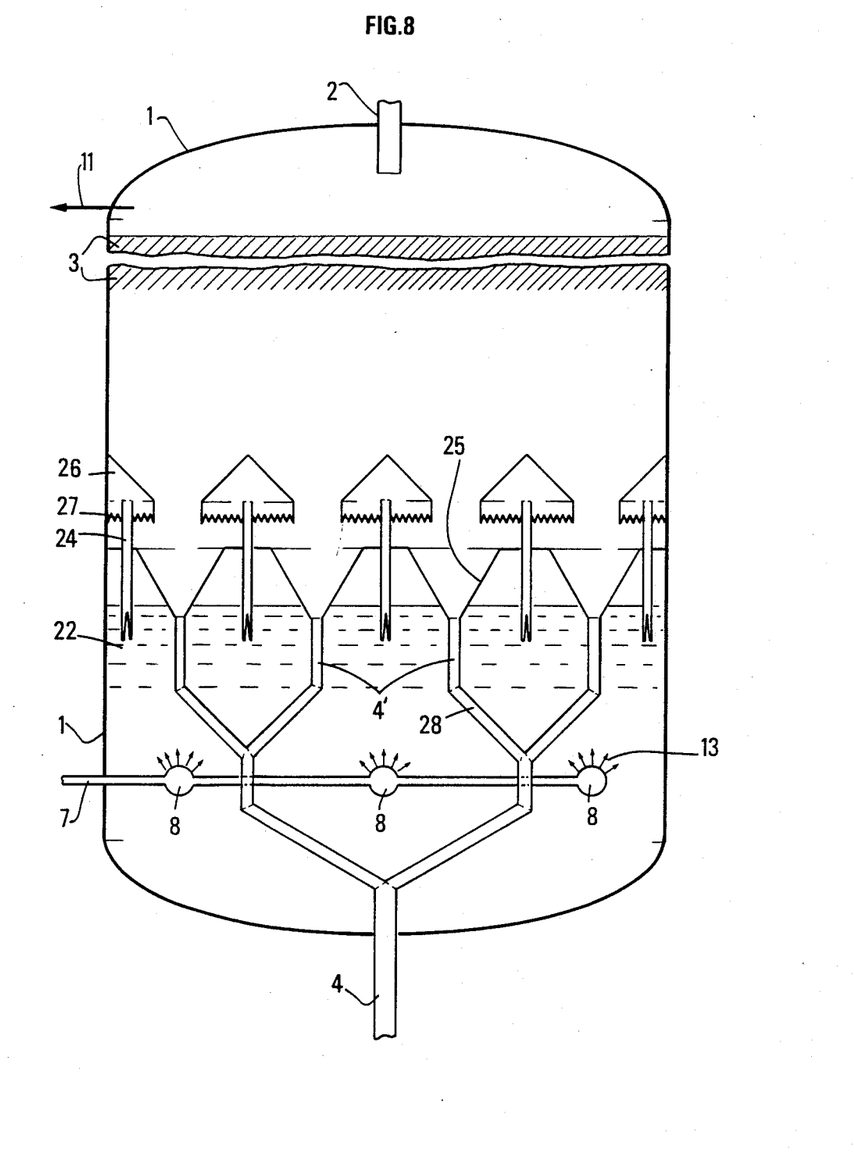
FIGS. 8 to 14 show other embodiments of the invention.
Figure 9:
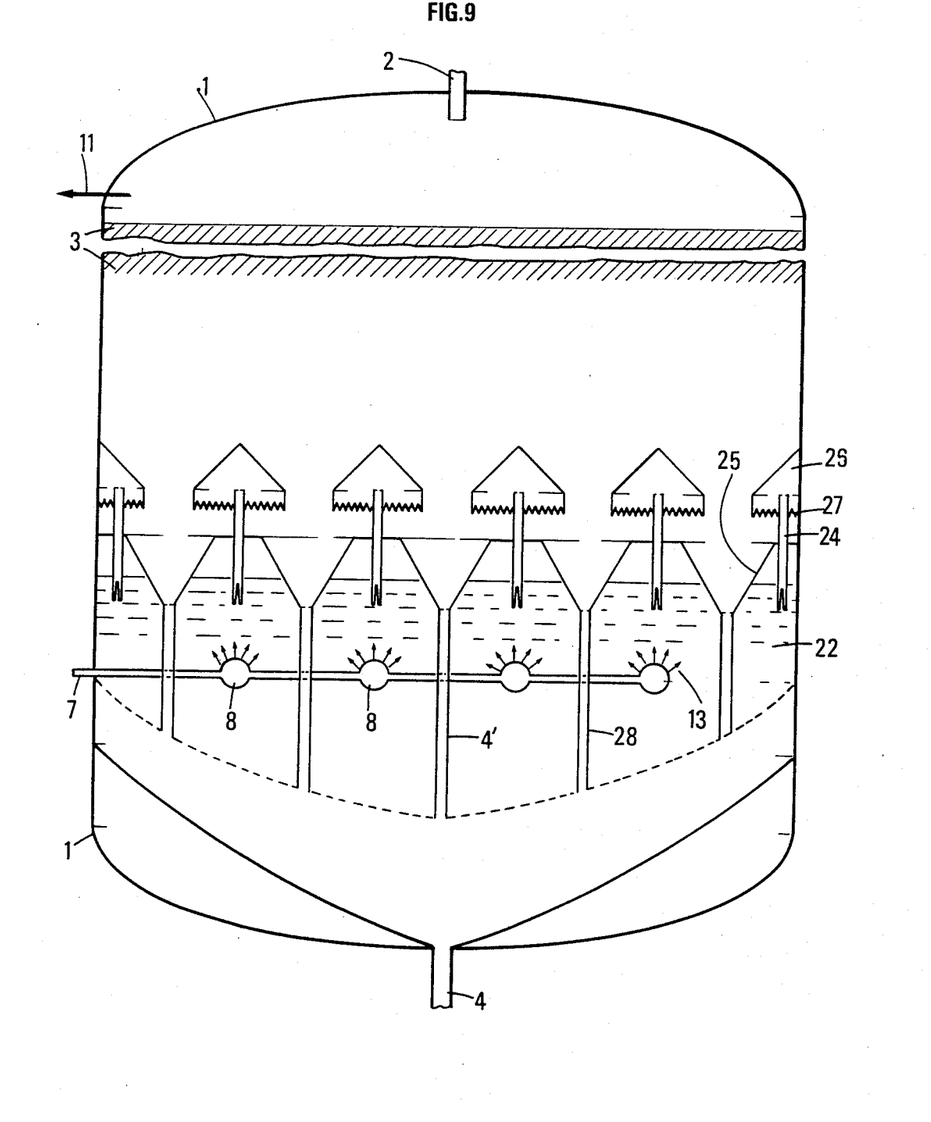

Thus, the apparatus (see FIGS. 8 and 9, illustrating two possible types of devices) comprises:

a substantially vertical reactor (1) of substantially elongate and cylindrical shape, means (2) for introducing solid particles at the upper part of the reactor, means for withdrawing solid particles from the lower part of the reactor, essentially consisting of at least one substantially vertical pipe (4), a plurality of funnels or flared zones (25) whose apices are turned downwardly, supporting said solid particles, which are located in the lower part of the reactor and are perforated for the passage of pipes (4) and of several pipes (24) forming part of at least one fluid charge injection device, said device being defined hereinafter, means (7 and 8) for introducing said fluid charge, formed of a liquid and a gas, at the lower end of the reactor, below each funnel (25), means (11) for withdrawing the reaction effluents from the upper part of reactor (1), the apparatus further comprising at least eight charge injection devices, each device comprising:

at least one substantially vertical leg or pipe (24) passing through said funnel, i.e., whose lower end is located below the wall or walls of said funnel (and above the means 7 and 8 for introducing said charge) and whose upper end is located above said funnel and relatively close thereto, a cap (26) covering the upper end of pipe (24), the lower part (or fringe) of said cap comprising several indentations or a series of indentations arranged on the major part of the perimeter thereof.

Figure 10:
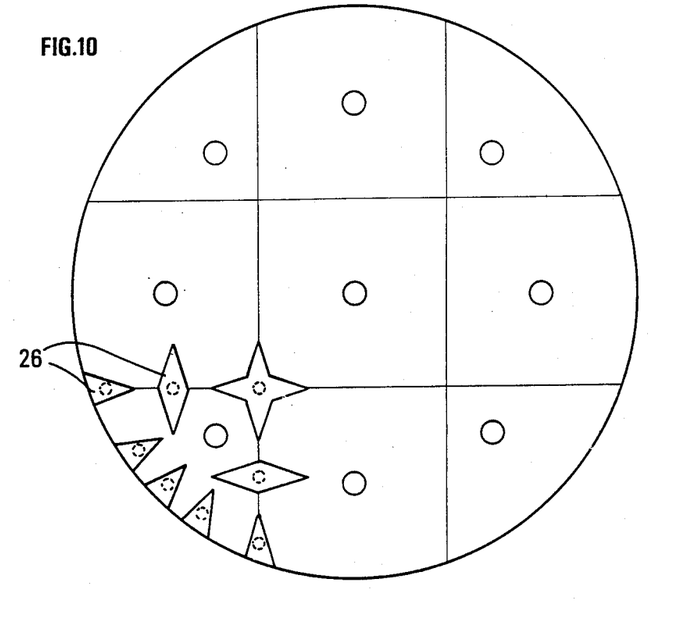
Figure 11:
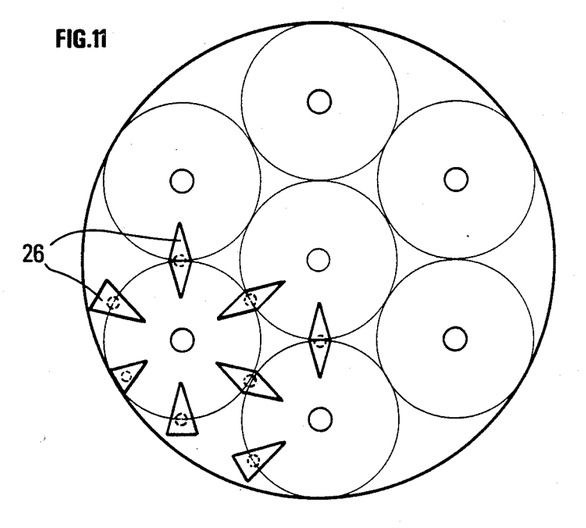
Figure 12:
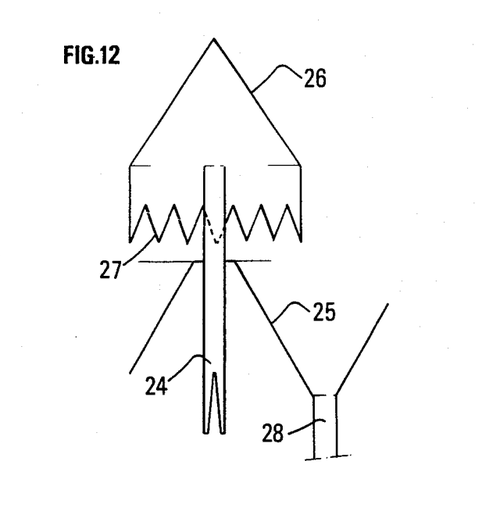
Figure 13:
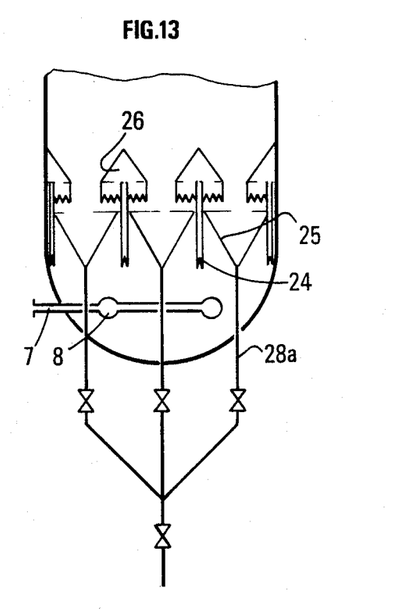
Figure 14:
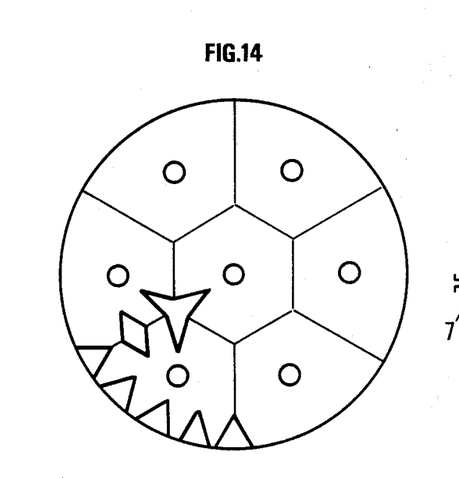

FIGS. 10 and 11 are top views of the device according to the invention. FIGS. 12, 13 and 14 are enlarged views or alternative embodiments of the system according to the invention. In FIG. 13, the catalyst discharge pipes are diagrammatically shown as line 28a (28 on the other figures).

What is claimed as the invention is:

1. An apparatus comprising:
    (a) a substantially vertical reactor vessel of elongate and cylindrical shape;
    (b) means for introducing solid particles into an upper part of said reactor vessel;
    (c) means for withdrawing solid particles from a bottom part of said reactor vessel, said means for withdrawing essentially consisting of at least one substantially vertical pipe extending to the exterior of said reactor vessel;
    (d) at least one funnel defining a flared zone for supporting solid particles, said flared zone having an apex which is turned downward, said funnel being arranged in a lower portion of said reactor vessel and said funnel being perforated for the passage of said at least one substantially vertical pipe and of at least two other substantially vertical conduits;
    (e) means for introducing a fluid charge, formed of a liquid and a gas, into a lower section of said reactor vessel below said funnel;
    (f) means for withdrawing reaction effluents from an upper part of said reactor vessel; and
    (g) at least two fluid charge injection devices, each device comprising:
        at least a respective one of said at least two substantially vertical conduits passing through said funnel, a lower open end of said respective substantially vertical conduit being located below said funnel and above said means for introducing a fluid charge, and an upper open end thereof being located above said funnel and relatively close thereto, and
        a cap covering said upper end of said substantially vertical conduit, a lower part of said cap defining a perimeter comprising several indentations arranged on a major part of said perimeter.

2. An apparatus according to claim 1, wherein said cap has the shape of a volume selected from the group comprising cone frustums, cone semi-frustums, pyramid frustums, pyramid semi-frustums, semi-spheres, quarter spheres, parallelipipeds, prisms, or a combination of pyramid semi-frustums and prisms and figures equivalent.

3. An apparatus according to claim 1, wherein the height of said indentations is 0.1–50% of the total height of said cap.

4. An apparatus according to claim 3, wherein the height of said indentations is 2–25% of the total height of said cap.

5. An apparatus according to claim 1, comprising 2 to 800 caps and 1 to 100 means (c) for withdrawing solid particles.

6. An apparatus according to claim 5, wherein at least 4 caps are arranged adjacent to a wall defining said reactor vessel and concentrically around said means (c) for withdrawing solid particles.

7. An apparatus according to claim 1, wherein said cap has a shape formed by the juxtaposition of a quarter pyramid and a prism.

8. An apparatus according to claim 1, wherein said substantially vertical conduit is arranged at the periphery of said funnel or flared zone and close to a wall defining said reactor vessel.

9. An apparatus comprising:
    (a) a substantially vertical reactor vessel of substantially elongate and cylindrical shape;
    (b) means for introducing solid particles into an upper part of said reactor vessel;
    (c) means for withdrawing solid particles from a bottom part of said reactor vessel, said means for withdrawing consisting essentially of at least one substantially vertical pipe extending to the exterior of said reactor vessel;
    (d) a plurality of funnels defining respective flared zones for supporting solid particles, said flared zones having apices which are turned downward, said funnels being positioned in a lower part of said reactor vessel and being perforated for passage of said at least one substantially vertical pipe and a plurality of substantially vertical conduits;
    (e) means for introducing a fluid charge, formed of a liquid and a gas, into a lower section of said reactor vessel, below each funnel or flared zone; and
    (f) means for withdrawing reaction effluents from an upper part of said reactor vessel, and
    (g) said apparatus comprising at least eight of said charge injection devices, each device comprising:
        at least one of said substantially vertical conduits passing through a respective one of said funnels, a lower open end of said at least one substantially vertical conduit being located below said respective funnel and above said means for introducing a fluid charge, and an upper open end thereof being located above said funnel and relatively close thereto, and
        a cap covering said upper end of each of said substantially vertical conduits, a lower part of said cap defining a perimeter and comprising several indentations arranged on the major part of said perimeter.

10. An apparatus according to claim 9, comprising 7 to 700 caps and 3 to 100 of said means (c) for withdrawing solid particles.

* * * * *